United States Patent [19]
Aftelak

[11] Patent Number: 6,134,242
[45] Date of Patent: Oct. 17, 2000

[54] METHOD OF REVERTING TO TANDEM OPERATION BETWEEN TRANSCODERS OF A COMMUNICATION SYSTEM

[75] Inventor: Steven Basil Aftelak, Swindon, United Kingdom

[73] Assignee: Motorola, Inc., Schaumburg, Ill.

[21] Appl. No.: 08/970,700

[22] Filed: Nov. 14, 1997

[30] Foreign Application Priority Data

Dec. 9, 1996 [GB] United Kingdom .................. 9625567

[51] Int. Cl.[7] .................................................. H04J 3/12
[52] U.S. Cl. .......................... 370/465; 370/509; 370/522; 704/212; 704/221
[58] Field of Search .................................. 370/337, 522, 370/328, 345, 347, 350, 529, 465, 466, 512; 704/221, 212, 228, 230, 267; 455/436

[56] References Cited

U.S. PATENT DOCUMENTS

| | | | |
|---|---|---|---|
| 4,817,146 | 3/1989 | Szczutkowski et al. .................. 380/48 |
| 5,793,810 | 8/1998 | Han et al. ................................. 375/242 |
| 5,903,552 | 5/1999 | Raith ......................................... 370/337 |
| 5,956,673 | 9/1999 | Weaver, Jr. et al. ..................... 704/221 |
| 5,991,716 | 11/1999 | Lehtimaki ................................ 704/212 |

*Primary Examiner*—Seema S. Rao
*Attorney, Agent, or Firm*—Heather L. Creps

[57] ABSTRACT

To facilitate the reversion of a communication to tandem operation (200), a first transcoder (20), having previously changed back to tandem operation (206), inverts bits (208) of a double-encoded frame format that correspond to synchronisation bits in a non-tandem, single-encoded frame format to generate errors, in relation to the synchronisation bits, at a second transcoder (34). Upon detection (210) of a predetermined number of errors in the synchronisation bits during a predetermined time, the second transcoder (34) reverts to tandem operation, as shown in the flow diagram of FIG. 2.

8 Claims, 2 Drawing Sheets

METHOD OF REVERTING TO TANDEM OPERATION BETWEEN TRANSCODERS OF A COMMUNICATION SYSTEM

BACKGROUND TO THE INVENTION

This invention relates, in general, to a communication system arranged to implement a transcoding operation, and is particularly, but not exclusively, applicable to method and associated signalling scheme arranged to provide a non-tandem voice coding operation in a cellular communication network.

SUMMARY OF THE INVENTION

In telephony systems generally, speech quality must be maintained at an adequate level to ensure meaningful and discernible communication. Indeed, in mobile communication networks, such as the Global System for Mobile (GSM) communication, it is becoming increasingly important to improve speech quality to satisfy the demands placed on the system by subscribers (particularly in relation to mobile unit to mobile unit calls) and to support and enhance the market penetration of such systems.

In mobile communication systems, a double encoding process currently takes place. Specifically, a mobile unit will first encode speech for transmission to base station equipment over a radio frequency link, for example. Subsequently, the fixed infrastructure equipment will further encode the signals for transmission onward into the system to ensure efficient and robust communication over an air-interface (typically to another mobile unit).

In relation to GSM, for example, a mobile unit encodes a speech communication at a rate of 16 kbit/s, which includes 13 kbit/s of sampled and encoded speech and 3 kbit/s of ancillary information, such as parity check and correction bits (and the like) and synchronisation information; that are framed into what is known as a TRAU (Transcoder Rate Adaption Unit) frame. This 16 kbit/s speech is multiplexed into a time-slot containing three other speech calls to produce a channel of 64 kbit/s on a landline, and this channel is communicated by a base station controller (BSC) (in a downlink) to at least one fixed base transceiver station (BTS). As will be understood, the BTS serves a cell that is typically partitioned into distinct sectors each administered by individual transceivers, while a BSC serves a group of cells. A transcoder (which provides a transposition in the coding scheme received by the BTS) de-multiplexes the channel and then encodes each speech communication as a 64 kbit/s pulse code modulated (PCM) format for transparent and sequential transmission through a first Mobile Switching Centre (MSC), a second MSC and then to a second transcoder for PCM decoding for onward routing to a BSC, BTS and ultimately, perhaps, to another subscriber unit.

With specific regard to the encoding operation of the GSM system (which is used solely for the purposes of explanation), a TRAU frame of information has a duration of 20 milliseconds (ms), while speech is sampled at a rate of 8000 samples per second. Therefore, each 20 ms section of speech consists of one-hundred and sixty 8-bit samples. Subsequently, transcoder operation codes these one-hundred and sixty samples as an 8-bit PCM word to provide 1280 bits of PCM information per frame (equivalent to 64 kbit/s). As will be understood, the structure of the 8-bit PCM frame is indicative of a signal level, with the Least Significant Bit (LSB) being of relatively little importance in the re-construction of encoded information when compared with the relative importance of successive bits. As such, the Most Significant Bit (MSB) has the greatest effect on the re-construction of encoded information, since its bitvalue has very much greater significance than the bit-value of the LSB.

It has been identified that call speech quality for all mobile-to-mobile calls can be significantly improved by using so-called 'non-tandem' or 'vocoder by-pass' operation which avoids PCM encoding between transcoders. In this respect, signalling schemes between MSCs have been suggested, but these schemes suffer from significant signalling delay problems and cannot determine when calls are routed via external voice compression networks (and hence fail in this instance). An alternative mechanism involves the sending of encoded speech on the least significant bits (LSBs) of the 64 kbit/s PCM circuits in-band and without additional signalling or handshaking, but this mechanism is not effectively optimised in terms of system control and signalling. Another proposed mechanism involves the use of an in-band signalling scheme, but this is only used during call set-up and cannot handle changes in a communication arising from call routing that may be invoked either during supplementary services or handover.

Non-tandem operation has also been invoked by mechanisms such as that described in WO 96/23297 in which a predetermined data pattern is sent in-band on least significant bits of a selected frame of, for example, a 64 kbit/s voice circuit. In the event that this embedded data channel is detected at a second transcoder in the communication path, non-tandem (transcoder by-pass) operation is invoked and 16 kbit/s encoded Transcoder Rate Adaption Unit (TRAU) frames (in the particular case of GSM) are passed directly over two bits of the 64 kbit/s circuit. It will be appreciated that this in-band (embedded data channel) encoding is ostensibly undetectable to normal voice calls. The purpose of the data pattern is to identify the type, format and compatibility of the transcoder (such as a manufacturer specific machine having a particular PCM frame format) used in the encoding process. As such, the predetermined data pattern is assigned according to the type of transcoder and is therefore retained within the transcoder for encoding and identification purposes. More specifically, if is possible to identify the encoding transcoder then it is possible to achieve vo-coder by-pass (i.e. non-tandem operation) by either modifying the operation of the decoding transcoder or, preferably, by eliminating entirely the need for transcoder encoding and decoding in the event that the interconnected transcoders are structurally identical and that they are therefore capable of supporting direct information transfer at merely a speech encoded level.

FIG. 1 shows a block diagram of a prior art communication system 10 having transcoders arranged to implement a non-tandem voice coding operation. The communication system 10 is shown in simplified form and is illustrative of a call routing mechanism between subscriber units within the communication system. The subscriber units may be mobile units or may be fixed site terminals, and may be located with a coverage area served by a common BTS or in distinct cells. A first subscriber unit 12 communicates data 16 (on an up-link) to a first BTS 14 over a communication link, such as a radio frequency channel or a fibre-optic link. The first BTS 14 is coupled to a first BSC 18, which first BSC 18 is coupled to a first transcoder (XCDR$_1$) 20. Data 16 is therefore passed in sequence from the first subscriber unit 12 to the first transcoder 20. The first transcoder 20 is coupled to the first MSC 22 through a traffic channel resource 24 and a control channel resource 26. The control channel resource is bidirectional and is arranged principally to transfer control information for system management between the first transcoder 20 and the first MSC 22. A second distantly located MSC 28 is further coupled to the first MSC 22 via a traffic channel resource 30 and a control channel resource 32, while a second transcoder ($XCDR_2$) 34 is coupled to the second MSC via a traffic channel resource 36 and a control channel resource 38. In a downlink, the second transcoder 34 is coupled to a second BSC 40, which in turn is coupled to a second BTS 42. Finally, the second BTS is arranged to relay the original data 16 to a second subscriber unit 44 over an appropriate communication medium 46.

For the sake of brevity, the communication system 10 is illustrated and described with only limited amounts of infrastructure and subscriber equipment, although it will be readily appreciated that the system will comprise many subscriber units and many transcoders, for example.

In the system of FIG. 1, non-tandem operation may be invoked on the following basis. Transcoder $XCDR_1$ receives an encoded speech signal (such as, for example, the 16 kbit/s multiplexed speech used in GSM), and then determines whether non-tandem operation is possible, as described in UK patent application UK 9616734.1. In the negative, the encoded speech is further encoded by a PCM process (or the like). After double-encoding with the PCM, transcoder $XCDR_1$ steals the least significant bit of all PCM words of a selected frame and substitutes these least significant bits with a data pattern indicative of the transcoder type of $XCDR_1$ (thereby modifies the information content of the sample). After the data pattern has been inserted, the PCM encoded information, in this instance, is relayed (or transmitted) 62 to $XCDR_2$. Subsequently, the second transcoder decodes the received PCM encoded signal. In the event that the $XCDR_1$ (embedded) data pattern is present (identifying an originating transcoder type as compatible or complementary to the transcoder type receiving the PCM signal), vo-coder by-pass is established where subsequent information received is anticipated to be encoded speech and is therefore routed directly through the transcoder without the need for a PCM decode. Typically, transcoder $XCDR_2$ transmits an identification or acknowledgement on the signalling channel (i.e. on a control channel resource) to the transcoder originating the call, i.e. $XCDR_1$, to indicate that it is capable and ready to receive information that has been merely speech encoded.

During non-tandem operation between an inbound leg and an outbound leg of an on-going communication (where each leg can be considered to comprise all subscriber and infrastructure equipment between a mobile or fixed subscriber unit and an MSC), a frame structure 60 of a typically encoded speech signal comprises an initial synchronisation sequence 62 followed by control information 64. Subsequent to the control information 64, the frame 60 principally contains data (perhaps in the form of contiguous octets) 66–72. However, to ensure maintenance of synchronisation during the relatively long period of data transmission within the frame 60, additional synchronisation bits 74–76 are periodic interspersed within these octets. Typically, there is one synchronisation bit in every two octets. Finally, the frame 60 is usually terminated with an additional block of control information 78.

A critical requirement for such non-tandem operation is the ability to detect the need and quickly revert to PCM (tandem) operation. This is necessitated when the transfer path between the two legs becomes non-transparent, i.e. when information (e.g. the coded speech signal) is corrupted on receipt. Moreover, the requirement to revert to tandem operation becomes more crucial when the coded speech signal has been replaced by a PCM signal in one direction of the link between the two legs. Indeed, fast detection and switching to the PCM transfer mode is required because any interpretation of either the PCM signal or severely corrupted coded speech as being legitimate coded speech, will result in a major degradation in speech quality. In fact, for the duration of any interpretation of the corrupted or PCM signal (by the infrastructure equipment) as legitimate coded speech, the end result will probably be completely unintelligible.

In UK patent application UK 9616734.1, switching to PCM mode relies upon the sending of a low-level but noisy PCM signal (in the form of a fixed known PCM pattern on the upper bits) along with the coded speech on the 64 kbits/s channel (in the particular case of GSM). In nearly all cases, errors or deliberate changes in this pattern can therefore be detected very quickly and allow sub-millisecond (ms) switching to PCM. Unfortunately, after such a switch, there is an inevitable period of time when the low-level but relatively noisy PCM (i.e. the fixed pattern) signal is encoded and forwarded to the mobile station. To avoid this delay, alternative proposals for tandem-free operation send the original PCM signal (in place of the fixed pattern) together with the coded speech, but this means that a quick switch to the PCM mode is not possible because a random, information-carrying pattern (rather than a predetermined bit sequence) exists in the upper bits of the channel. As such, these alternative proposals rely on identifying errors in the framing of the coded speech.

Additionally, there are certain events that cause corruption of the coded signal, or replacement of coded speech with PCM, which only affect one direction of the signal transport mechanism between the two legs of the call. For example, a Dual Tone Multiple Frequency (DTMF) signal or call progress tones inserted into the external network (i.e. whatever infrastructure resides between the two MSCs, or between an MSC and a routing node or Private Branch Exchange (PBX), for example) may only be sent in one direction. This form of unidirectional corruption will only be seen at the leg receiving the DTMF signal (e.g. leg #1 containing BTS 14 to MSC 22), which leg will then switch to PCM to interpret the incoming signal as PCM and (in relation to its transmission path in the opposite direction towards the other leg) will also start sending out PCM in place of coded speech. This process inevitably incurs a delay which may therefore result in the received (corrupted speech or PCM) signal being interpreted as legitimate coded speech.

Furthermore, in the opposite direction (i.e. towards the infrastructure in the other leg which has not been subjected to the uni-directional corruption and has not been informed of the change to tandem operation), encoded speech will be deemed to be legitimate coded speech until such time as leg #2 (i.e. the leg containing MSC 28 to BTS 42) identifies that leg #1 has switched to tandem operation and is therefore sending PCM. An inevitable and unacceptable delay therefore occurs in this switching of leg #2, during which time there is a degradation in service because incoming PCM is interpreted as encoded speech. In a similar manner to leg #1, the speed of detection (and hence the reversion to tandem operation) depends on identifying synchronisation errors in the framed coded speech signal.

A requirement therefore exists for an effective mechanism for reverting to tandem operation from a vo-coder by-pass mode that quickly re-establishes PCM operation at both transcoders.

SUMMARY OF THE INVENTION

According to a first aspect of the present invention there is provided a method of switching from a non-tandem operating mode in which information is communicated in a single-encoded frame format to a tandem operating mode in which information is communicated in a double-encoded frame format in a communication system comprising a plurality of transcoders, the method comprising the steps of: at a first transcoder: switching to the tandem operating mode; and inverting bits of the double-encoded frame format that correspond to synchronisation bits in the single-encoded frame format; at a second transcoder initially operating in the non-tandem operating mode and coupled to the first transcoder: perceiving the reception of the double-encoded frame format as a single-encoded frame format; detecting a plurality of errors in the synchronisation bits of the single-encoded frame format as a consequence of the corresponding bits in the double-encoded frame format being inverted; and switching to the tandem operating mode in response to detecting the plurality of errors in the synchronisation bits.

To ensure quick reversion to tandem operation, synchronisation bits are interspersed throughout a frame. Furthermore, to ensure that no information is lost during reversion, the present invention contemplates buffering the information received by the second transcoder and, in response to switching to the tandem operating mode, treating the buffered information as a double-encoded frame format and decoding the buffered information appropriately.

An exemplary embodiment of the present invention will now be described with reference to the accompanying drawings.

DETAILED DESCRIPTION OF A PREFERRED EMBODIMENT

Figure 1:
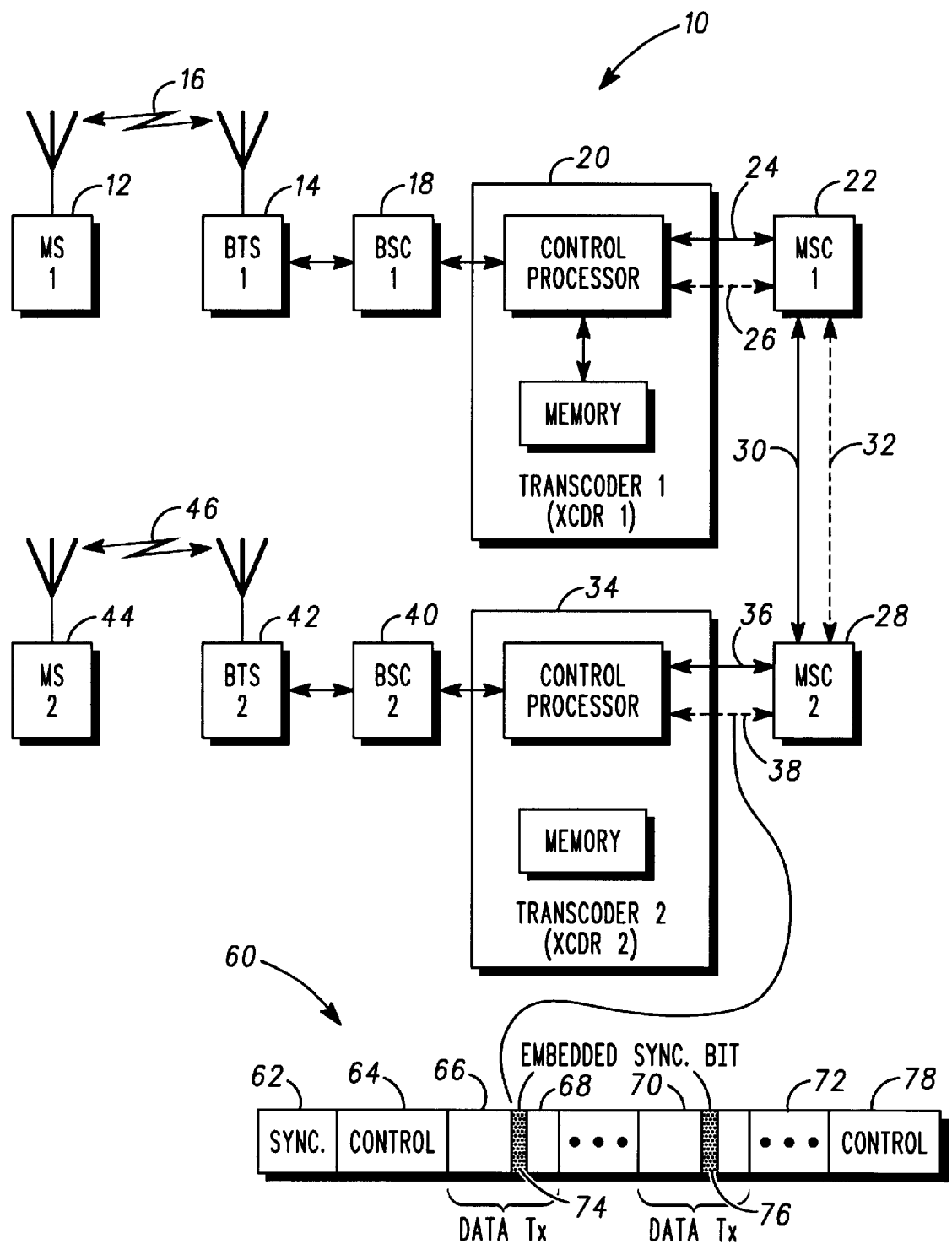
FIG. 1 is a block diagram of a prior art communication system having transcoders arranged to implement a non-tandem voice coding operation, and an exemplary frame format utilised during communications.

According to a preferred embodiment of the present invention, the detection of the switch to PCM in the appropriate receiver in leg #2 can be speeded up significantly by the equipment in leg #1 (once it has switched to PCM mode) pre-processing the PCM signal it sends towards leg #2. Since the infrastructure in leg #1 has full knowledge of the framing structure of the coded speech signal it sends to leg #2, and particularly a knowledge of the positioning and timing of the synchronisation bits within this framing structure, leg #1 knows which particular bits in the PCM signal will be interpreted in leg #2 as (and correspond to) synchronisation bits. Therefore, by having leg #1 selectively affect bits in the PCM signal that correspond to synchronisation bits in a speech encoded frame format, leg #2 can detect the need to interpret the incoming signal as PCM by virtue of the presence of repetitive synchronisation errors. Leg #2 can therefore quickly change its operating mode from vo-coder by-pass to tandem operation in response to leg #1 switching modes and stealing and altering PCM bits corresponding to synchronisation bits in a legitimate speech encoded frame.

More particularly, the preferred embodiment of the present invention ensures that, for a predetermined (but short) period, all such bits in the PCM signal that correspond to synchronisation bits (as far as leg #2 is concerned) contain values that are the inverse of the synchronisation bit values. Restricting bit stealing and inversion to a limited period (i.e. a predetermined number) is desirable so as to reduce overall corruption of the PCM signal, generally. Furthermore, in the preferred embodiment, the positioning of the framed coded speech signal in the octet-aligned (PCM) signal transferred between the two legs is such that it occupies, if possible, the lowest bit position (i.e. the LSB). The potential corruption of a few low order bits in the PCM signal sent to leg #2 will therefore have little noticeable effect on the perceived quality of the PCM signal received at leg #2.

The preferred embodiment of the present invention further contemplates that only 2 synchronisation bit errors need to be detected in leg #2 in a single frame of coded speech in order for leg #2 to switch to interpreting the incoming signal as PCM. This number is an arbitrary choice, although it may be desirable to ensure that more synchronisation errors are detected during a single frame to guarantee that reversion to tandem operation is required, as will be appreciated.

Now, considering GSM as a particular example, the mid-portion of the frame for coded speech in GSM (the so called TRAU frame) contains sequences of pairs of octets, where all bits in the octets are coded speech except for one, which is a synchronisation bit. By ensuring that all such synchronisation bit positions are in error (via the pre-processing in leg #1), leg #2 is guaranteed to switch to PCM mode within the reception period of four framed coded speech octets. In GSM, this period is 2 ms. In fact, if buffering of at least four octets of coded speech takes place in leg #2 (prior to forwarding to the second mobile station 44), it is possible that the switch to PCM can occur without leg #2 incorrectly interpreting any incoming PCM as legitimate encoded speech. Specifically, to receive at least two synchronisation bits, leg #2 must receive four octets, and so buffering of these four octets allows subsequent processing (in leg #2) of the encoded information in the tandem mode.

Figure 2:
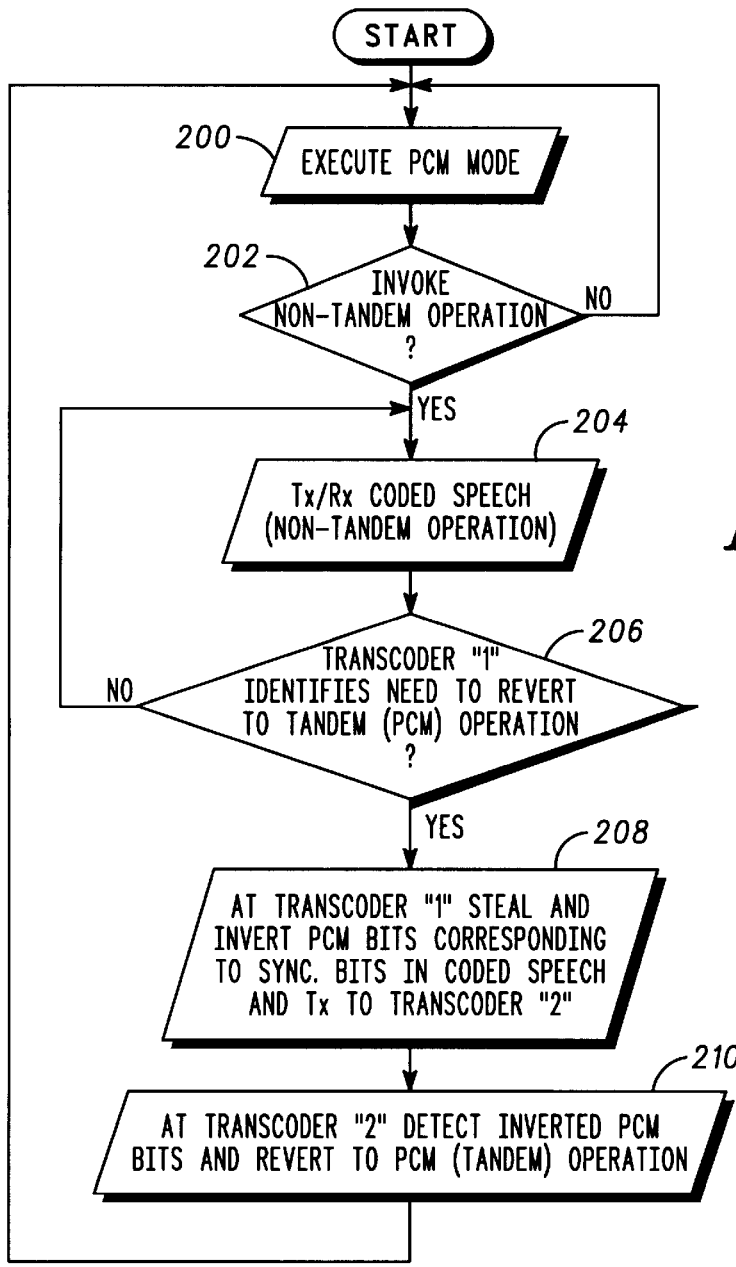
FIG. 2 is a flow diagram illustrating a mechanism for reversion to tandem operation according to a preferred embodiment of the present invention.

FIG. 2 is a flow diagram illustrating a mechanism for reversion to tandem operation according to a preferred embodiment of the present invention. The system initially operates in a PCM mode 200 before the system makes a determination to enter non-tandem (vo-coder bypass) operation at the affirmative branch of decision box 202. Subsequent to entering non-tandem operation, the plurality of transcoders that are party to an on-going communication relay coded speech 204 to each other. At the affirmative branch of decision block 206, a first transcoder has been influenced by an external network (or otherwise) to revert to PCM operation, or else (in the negative) non-tandem operation is maintained. At 208, the first transcoder has reverted to PCM and steals and inverts PCM bits corresponding to synchronisation bits in the framed coded speech transmission. PCM transmission to the second transcoder in the communication is now occurring. At 210, the second transcoder detects the requisite number of inverted (and hence erroneous) synchronisation bits in the anticipated coded speech frame, and there identifies that PCM operation has re-commenced and that the received frame should (rather than being by-passed) be decoded as PCM. The system then returns to block 200 where full PCM operation is in progress.

Preferably, the synchronisation bits utilised by the mechanism of the present are embedded (interspersed) with a plurality of contiguous data streams contained in a single frame of data, although the present invention is applicable for use with synchronisation bits present at a single location with a frame.

Figure 3:
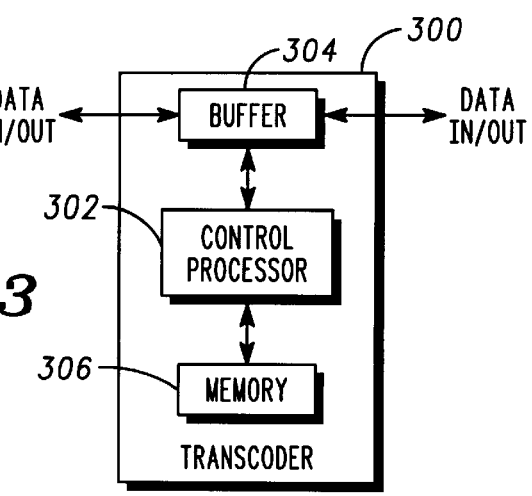
FIG. 3 illustrates a block diagram of a transcoder that may be utilised in the method of the present invention.

FIG. 3 is a block diagram of a transcoder 300 that may be utilised in the method of the present invention. The transcoder 300 comprises processor intelligence 302 that is capable of controlling the operation of the transcoder 300. The processor intelligence 302 is coupled to a buffer 304 that is initially receptive to a data stream, and is arranged temporarily to store (for subsequent processing purposes) data received by the transcoder 300. The processor intelligence 302 is further coupled to a memory 306 that stores, amongst other things, the framing format for a speech coded frame. The processor intelligence 302 is therefore able to access the memory 306 and to modify or interrogate a data stream to insert or determine the existence of an inverted synchronisation bit, respectively.

Without the bit stealing and inversion technique of the present invention, the detection period for reversion to PCM operation may be extended significantly, since the probability of receiving an error value in a synchronisation bit position of an incoming 'random' PCM signal is approximately 0.5. However, the present invention ensures that, for a pre-defined period, bits in the synchronisation bit positions are incorrect, and that the probability of receiving an incorrect synchronisation bit approaches unity. (The probability may be very slightly less than one due to corruption of the inverted bit on the path between leg #1 and leg #2). Furthermore, only a handful of bits in the PCM signal sent from leg #1 need to be stolen and inverted to guarantee detection by leg #2 and reversion to tandem operation.

The present invention therefore advantageously provides a quick and effective mechanism for reverting to tandem operation. Furthermore, the technique of the present invention is valid for use with all current and future GSM codecs (including half rate, full-rate and extended full-rate formats), and may be used in other telecommunication networks where voice coding and/or compression is used for different phases (within the infrastructure) of a call.

It will, of course, be appreciated that the above description has been given by way of example only, and that modifications in detail, such as the application of the general principal to data communication and particularly in the event that the communication resource between transcoders (MSCs) is both of sufficiently high quality and is sufficiently robust, may be made within the scope of the present invention. Furthermore, as will be appreciated, although the transcoders of FIG. 1 are shown located between the MSC and BSC (and, indeed, are usually proximal to the MSC in-many systems), the present invention is not limited to this structure and therefore contemplates the positioning of the transcoders in other locations within the illustrated infrastructure, particularly in a position between the BTS and BSC. Additionally, while the detailed description has made specific reference to a system in which mobile units communicate with base transceiver stations, it will be appreciated that the present invention is equally applicable to a system that utilises a fixed connection, such as to a Public-Switched Telephone Network (PSTN) or a Private Branch Exchange (PBX).

What is claimed is:

1. A method of switching from a non-tandem operating mode in which information is communicated in a single-encoded frame format to a tandem operating mode in which information is communicated in a double-encoded frame format in a communication system comprising a plurality of transcoders, the method comprising the steps of:

at a first transcoder:
   switching to the tandem operating mode; and
   inverting bits of the double-encoded frame format that correspond to synchronisation bits in the single-encoded frame format, the synchronisation bits interspersed throughout a frame;

at a second transcoder initially operating in the non-tandem operating mode and coupled to the first transcoder:
   perceiving the reception of the double-encoded frame format as a single-encoded frame format;
   detecting a plurality of errors in the synchronisation bits of the single-encoded frame format as a consequence of the corresponding bits in the double-encoded frame format being inverted; and
   switching to the tandem operating mode in response to detecting the plurality of errors in the synchronisation bits.

2. The method of claim 1, wherein the plurality of errors in the synchronisation bits occur within a frame.

3. The method of claim 2, wherein switching to the tandem operating mode occurs when two errors are detected within the frame.

4. The method of claim 1, wherein the first transcoder inverts a predetermined number of bits of the double-encoded frame format that correspond to successive synchronisation bits in the single-encoded frame format.

5. The method of claim 1, wherein the single encoded frame format is encoded speech.

6. The method of claim 5, wherein the double encoded format is a pulse code modulation of the encoded speech.

7. The method of claim 1, further comprising the steps of: buffering information received by the second transcoder; and
   in response to switching to the tandem operating mode, treating the buffered information as a double-encoded frame format and decoding the buffered information appropriately.

8. The method of claim 1, wherein switching of the first transcoder is in response to an influence exerted on the first transcoder by an external network.

* * * * *